(12) United States Patent
Linder et al.

(10) Patent No.: US 9,514,651 B2
(45) Date of Patent: Dec. 6, 2016

(54) OPTIMAL WARNING DISTANCE

(71) Applicant: HERE Global B.V., Veldhoven (NL)

(72) Inventors: Eric Linder, Downers Grove, IL (US);
Gavril Giurgiu, Chicago, IL (US);
Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 81 days.

(21) Appl. No.: 14/462,841

(22) Filed: Aug. 19, 2014

(65) Prior Publication Data
US 2016/0055750 A1 Feb. 25, 2016

(51) Int. Cl.
*G08G 1/16* (2006.01)
*G08G 1/0967* (2006.01)

(52) U.S. Cl.
CPC ............ *G08G 1/166* (2013.01); *G08G 1/0967* (2013.01); *G08G 1/16* (2013.01)

(58) Field of Classification Search
CPC ..................................................... G08G 1/166
USPC ................... 340/905, 439, 575, 576
See application file for complete search history.

(56) References Cited

U.S. PATENT DOCUMENTS

| | | | |
|---|---|---|---|
| 5,684,473 A | | 11/1997 | Hibino et al. |
| 5,900,825 A | * | 5/1999 | Pressel et al. ................ 340/905 |
| 6,263,282 B1 | | 7/2001 | Vallancourt |
| 6,608,559 B1 | | 8/2003 | Lemelson et al. |
| 7,821,421 B2 | * | 10/2010 | Tamir et al. ................ 340/901 |
| 8,103,449 B2 | * | 1/2012 | Mudalige ................ 701/301 |
| 8,593,301 B2 | | 11/2013 | Newman |
| 2002/0121981 A1 | * | 9/2002 | Munch .................. G08B 21/06 340/576 |
| 2007/0063824 A1 | | 3/2007 | Gaddy et al. |
| 2007/0075850 A1 | | 4/2007 | Lucas et al. |
| 2010/0019932 A1 | | 1/2010 | Goodwin |
| 2012/0271484 A1 | | 10/2012 | Feit et al. |
| 2013/0338914 A1 | | 12/2013 | Weiss |
| 2015/0314783 A1 | * | 11/2015 | Nespolo ............ B60W 30/0953 701/301 |

FOREIGN PATENT DOCUMENTS

| | | |
|---|---|---|
| CA | 2446545 | 11/2002 |
| DE | 19510910 A1 | 9/1995 |

(Continued)

OTHER PUBLICATIONS

Daniel B. Fambro et al., NCHRP Report 400, Determination of Stopping Sight Distances, 1997, National Cooperative Highway Research Program, Washington D.C.

(Continued)

*Primary Examiner* — Brent Swarthout
(74) *Attorney, Agent, or Firm* — Lempia Summerfield Katz LLC (57) ABSTRACT

Systems, methods, and apparatuses are provided for determining an optimal warning distance for a vehicle. For example, the geographic location of the vehicle is received along with a reaction profile of the operator of the vehicle. Based on the geographic location, a roadway condition is determined. An optimal warning distance is then determined based on a braking distance of the vehicle and the reaction profile of the operator of the vehicle. The operator of the vehicle, or a navigation system of the vehicle itself, is alerted to the roadway condition when the vehicle is located at the optimal warning distance.

18 Claims, 5 Drawing Sheets

(56) References Cited

FOREIGN PATENT DOCUMENTS

| DE | 102008019519 A1 | 6/2009 |
|----|-----------------|--------|
| DE | 102011121763 | 6/2013 |
| WO | WO9324894 A1 | 12/1993 |
| WO | WO02071202 | 9/2002 |
| WO | WO2013064254 | 5/2013 |
| WO | WO2014015922 | 1/2014 |

OTHER PUBLICATIONS

John D. Lee et al., Human Factors: The Journal of the Human Factors and Ergonomics Society, Jan. 1, 2002, http://hfs.sagepub.com/.

European Office action for related European Application No. 15179462.5, Received Jan. 12, 2016.

\* cited by examiner

OPTIMAL WARNING DISTANCE

FIELD

The following disclosure relates to systems, methods, and apparatuses for determining an optimal warning distance for a vehicle operator or vehicle navigation system.

BACKGROUND

As a driver of a vehicle travels along a roadway, the driver may have to reduce the vehicle speed due to an upcoming curvature in the road, school or park zone, weather condition (e.g., black ice), traffic incident, or traffic congestion. There may be a desire to alert the driver of the upcoming roadway condition. If the warning or alert message is generated too close to the event, the driver may not have enough time to stop or slow down. On the other hand, if the warning or alert message is generated too early; the driver may react unnecessarily and affect neighboring vehicles. Therefore, there is a continuing effort to provide improved systems, methods, and apparatuses that determine an optimal warning distance for a driver or vehicle operator.

SUMMARY

Systems, methods, and apparatuses are provided for determining an optimal warning distance for an individual vehicle operator or vehicle navigation system. In one embodiment, the method comprises receiving a geographic location of a vehicle. The method further comprises receiving a reaction profile of an operator of the vehicle. The method further comprises determining a roadway condition based on the geographic location of the vehicle. The method further comprises calculating an optimal warning distance from the roadway condition based on a braking distance of the vehicle and the reaction profile of the operator. The method further comprises alerting the operator or a navigation system of the vehicle to the roadway condition when the vehicle is located at the optimal warning distance.

In another embodiment, a non-transient computer readable medium containing program instructions for causing a computer to perform the method of: (1) receiving a geographic location and direction of travel of an autonomous vehicle; (2) receiving a reaction profile of an operator of the vehicle selected from the group consisting of: an operator's age, an operator's health, an operator's preferred driving style, and combinations thereof; (3) determining a roadway condition in the direction of travel of the vehicle based on the geographic location of the vehicle; (4) calculating an optimal warning distance from the roadway condition based on a braking distance of the vehicle and the reaction profile of the operator; and (5) alerting a navigation system of the autonomous vehicle to the roadway condition when the vehicle is located at the optimal warning distance.

Apparatuses are also provided for determining optimal warning distances. In one embodiment, a device comprises at least one processor and at least one memory including computer program code for one or more programs, wherein the memory and the computer program code configured to, with the processor, cause the device to at least perform: (1) receive a geographic location and direction of travel of a vehicle; (2) receive a reaction profile of an operator of the vehicle; (3) determine a roadway condition in the direction of travel of the vehicle based on the geographic location of the vehicle; (4) calculate an optimal warning distance from the roadway condition based on a braking distance of the vehicle and the reaction profile of the operator; and (5) alert the operator or a navigation system of the vehicle to the roadway condition when the vehicle is located at the optimal warning distance.

BRIEF DESCRIPTION OF THE DRAWINGS

Exemplary embodiments are described herein with reference to the following drawings.

DETAILED DESCRIPTION

The optimal warning distance for alerting an individual vehicle operator or vehicle navigation system of an upcoming roadway condition (e.g., curve in the road, inclement weather, traffic accident) may vary based on the identified operator. For example, one vehicle operator may have a different reaction time required to safely adjust the speed of the vehicle than another vehicle operator for the upcoming roadway condition. Additionally, an individual vehicle operator may individually have different reaction times for a specific roadway condition based upon the time of the day, day of the week, day of the year, or other variable circumstances specific to the individual driver at a particular time. Further, the vehicle operator may have a reaction profile (e.g., personalized driving attributes) that affects the timing of the warning. For example, human driving characteristics (e.g., historically recorded driver characteristics, from probe points or otherwise) may indicate other factors that influence the warning distance. Specifically, understanding that other drivers, having similar personal characteristics to the individual driver, have historically made driving mistakes, may influence the timing for warning the individual driver of an upcoming roadway condition.

Therefore, systems, methods, and apparatuses are provided for determining an optimal warning distance for an individual vehicle operator or vehicle navigation system. In particular, the embodiments described herein provide systems, methods, and apparatuses for providing a vehicle operator or vehicle navigation system with a personalized warning at an optimal distance from a roadway condition to adjust the speed of the vehicle.

In certain embodiments, the systems, methods, and apparatuses comprise a server and/or processor for receiving vehicle information and vehicle operator information for analysis. The vehicle information may include the speed of the vehicle, the identification of the vehicle, the travel direction of the vehicle, and time stamp data. The vehicle operator information may include personal attributes of the operator (e.g., health, age, operator reaction time, driving characteristics). Based on the vehicle location and heading, the database provides attributes regarding upcoming roadway segments (e.g., curves in the road, weather, traffic incidents). Further, the database may be augmented with recorded historical data of vehicle operators having similar characteristics and operating a vehicle at the same roadway under similar roadway conditions (e.g., time of day, weather, construction, traffic). An optimal warning distance may be calculated and provided to the vehicle based upon the upcoming traffic condition and the operator's reaction profile. The embodiments are described in further detail herein.

Definitions

As used herein, a "vehicle operator" may refer to a driver of a vehicle or a passenger in an autonomous vehicle or highly assisted driving vehicle.

As used herein, a "roadway condition" may refer to any scenario along a roadway wherein a vehicle must adjust its velocity (e.g., slow down or stop) in order to safely traverse the condition or stop before reaching the condition. For example, a roadway condition may be an upcoming curve in the roadway requiring the vehicle's speed to be reduced from 60 km/hr to 40 km/hr in order to take the curve in the roadway safely. Other roadway conditions affecting an adjustment in the traffic speed include, but are not limited to, weather conditions (e.g., rain, snow, ice), traffic incidents, construction, or lane closures.

As used herein, a "roadway" may refer to any traveling lane or pathway that may be capable of being monitored for traffic congestion/incident detection, or may become capable of being monitored for traffic congestion/incident detection in the future (e.g., a highway, city street, bus route, train route, walking/biking pathway, waterway).

As used herein, a "reaction profile" may refer to the personalized characteristics of a driver that used to determining the operator's personalized braking distance ($D_{PR}$). The factors or variables influencing an operator's reaction profile may include: (1) an operator's reaction time ($T_{PR}$), (2) an operator's age, (3) an operator's health, (4) an operator's driving experience and accident history, (5) an operator's experience or knowledge traveling on the roadway at issue, (6) an operator's experience or knowledge operating the vehicle at issue, (7) an operator's employer's driving profile preferences, (8) an operator's insurance provider's driving profile preferences, and/or (9) an operator's personal driving preferences. In certain embodiments, the reaction profile comprises a combination of more than one factor or variable. In some embodiments, the combination of factors may be weighted, wherein one factor is given more weight than other factors in determining the appropriate, personalized braking distance.

As used herein, a "reaction time" may refer to the time it takes from when an operator is notified or alerted of a roadway condition before reacting to the notification or alert and adjusting the speed or direction of the vehicle ($T_{PR}$). This reaction time includes the time the operator needs to perceive the issue before reacting. For example, a driver of a vehicle may be alerted of that the vehicle speed needs to decrease from 60 km/hr to 40 km/hr. The driver may take 2.5 seconds to comprehend the notification before taking any action to adjust the speed of the vehicle. The 2.5 seconds is the driver's reaction time.

As used herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a "highly assisted driving (HAD) vehicle" may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

Reporting/Receiving Vehicle Information and Operator Information

In order to provide an optimal warning to a vehicle operator or vehicle navigation system of a roadway condition at an optimal time/distance from the condition, certain characteristics of the vehicle and the operator are determined. In certain embodiments, vehicle information and operator information (e.g., reaction profile of the operator) are provided to a server and/or processor for analysis in computing the optimal warning distance. The server and/or processor may be attached to or connected to the vehicle itself (e.g., included within a navigation device installed or connected to the vehicle). In some embodiments, the server and/or processor may be part of a portable navigation device (e.g., a mobile phone) within the vehicle. In some embodiments, the server and/or processor are located remote from the vehicle, and the vehicle and operator information are provided to the server and/or processor over a connected network between the vehicle and server.

The vehicle information may include an identification of the vehicle, geographic location of the vehicle (e.g., GPS), speed of the vehicle, and/or heading or travel direction of the vehicle. The operator information may include an identification of the operator (e.g., driver) and/or a reaction profile of the operator (described in greater detail below).

Determining Roadway Conditions

Based on the location of the vehicle and the direction of travel of the vehicle, a roadway condition may be identified. The roadway condition may be identified by retrieving traffic or roadway attributes (e.g., curves in the road) from a map database for the identified roadway in the direction of travel of the vehicle. Weather information may also be retrieved from the map database. The information may include real-time traffic data and weather collected by a navigation service provider. Alternatively, the traffic information or roadway attributes may be a historical database of driver speed information for a particular road segment at a particular time of day, day of week, or day of year. The historical database may also take into account similar weather conditions at a similar time of day, day of week, or day of year. In some embodiments, the traffic/road attribute information may be a combination of both real-time and historical traffic information.

The information from the map database may identify a roadway condition requiring the vehicle to adjust its speed within a defined distance/timeframe. As discussed in greater detail below, the distance in which the vehicle adjusts (e.g., reduces) its speed may be based on a braking distance of the vehicle and a reaction profile of the operator (e.g., reaction time).

Determining Optimal Warning Distance

In order for a vehicle to slow down or stop before reaching a roadway condition, the vehicle may be alerted at least a certain distance in advance of the roadway condition. The optimal warning distance to adjust the speed of the vehicle may be based on the vehicle's braking distance as well as the personal characteristics or attributes of the vehicle operator. In certain embodiments, an optimal warning distance ($D_{TOT}$) is determined based on a combination of the vehicle's braking distance ($D_{BR}$) and a braking distance associated with the operator's reaction profile ($D_{PR}$).

$$D_{TOT} = D_{BR} + D_{PR} \quad (1)$$

The reaction profile factors potentially influencing to the operator's braking distance ($D_{PR}$) are described in greater detail below.

Determining Vehicle Braking Distance

In certain embodiments, the vehicle braking distance ($D_{BR}$) may be: (1) a predetermined fixed distance, (2) a calculated distance based on physics principles, (3) a vehicle queue length from the roadway condition, (4) an average braking distance based on historical probe data, or (5) a weighted combination thereof. In one particular embodiment, the vehicle braking distance is a combination of an average braking distance observed from historical probe data and a vehicle queue length from the roadway condition.

The determination of an appropriate braking distance may also rely on the type of roadway condition (e.g., weather, road construction, road surface, road geometry), and the type of vehicle being operated (how quickly can the vehicle slow down).

In one embodiment, the vehicle braking distance is fixed ($D_{BR} = D_{CONST}$). For a particular roadway condition, an alert is determined at a fixed location upstream of the roadway condition. For example, a roadway may have a curve in the road requiring vehicle operators to slow down from an average speed of 60 km/hr to a speed of 40 km/hr. A safe, fixed braking distance may be determined to be 200 meters.

In another embodiment, the braking distance is calculated based on physics principles that take into account a vehicle's current speed ($V_0$), the vehicle's target speed ($V_1$), and the vehicle's deceleration ($\alpha$). Presuming the vehicle is moving with a constant speed $V_0$, the vehicle is warned that it has to slow down to a speed $V_1$ because of coming change in speed limit, or a coming curve, etc. Presuming the vehicle operator brakes with constant deceleration a (e.g., approximately 3.4 m/s$^2$), the braking distance ($D_{BR}$) is calculated as:

$$D_{BR} = \frac{V_0^2 - V_1^2}{2a} \quad (2)$$

In another embodiment, the braking distance is determined based on the vehicle queue length from the roadway condition. In other words, the braking distance from a roadway condition may be increased based on a traffic build-up. The queue length may be determined from historical traffic data (e.g., the average traffic build-up at a particular time of day, day of week, or day of year) or real-time traffic data (e.g., traffic data collected from a traffic service provider). For example, the roadway condition may be ice or snow, and the braking distance of the vehicle may be 200 meters to slow down from the vehicle's initial speed to safely navigate over the ice/snow. If there is real-time reported traffic build-up or queue of vehicles that stretches for 100 meters from the roadway condition, the braking distance of the vehicle may be increased based on that queue to a distance of, for example, 300 meters from the roadway condition.

In yet another embodiment, the braking distance is determined from historical probe data. Historical probe data may include data collected from a plurality of vehicles traveling on a particular roadway segment at a particular time of day, day of week, or day of year, and under certain weather and roadway conditions. In other words, probe data may include a collection of data points for a number of vehicles, each vehicle providing information regarding its speed, heading, location, timestamp, etc. The vehicle data may be obtained from a single sensor such as GPS or a combination of sensors such as GPS, accelerometer, and gyrometer sensors within the vehicle. The vehicle probe data may be transmitted to an external server/processor and stored in a map database. The database may be combined with weather and/or road condition data associated with each particular time stamp.

In certain embodiments, a navigation service provider may provide historical probe data identifying the average vehicle speed at various locations of a road segment. The probe data may be used to identify where to alert a vehicle to adjust its speed based on when vehicles historically adjusted speed in advance of a roadway condition. In other words, based on the historical speed profile, a vehicle operator warning may be determined where the average or median speed begins decreasing. In certain embodiments, the probe data may include additional information associated with the historical data that may affect the average vehicle speed or timing of a vehicle speed adjustment such as the weather conditions (e.g., rain, sunshine, ice/snow), road conditions (e.g., construction, bumpy roads, smooth resurfaced roads, width of the lanes), or the traffic conditions (e.g., congestion, open roads, traffic incidents). In some embodiments, the optimal warning distance may be increased or decreased based on the variations in the weather, road, or traffic conditions of the historical probe data and the current weather, road, or traffic conditions being monitored. In other embodiments, only the probe data that similarly matches the current weather, road, and/or traffic conditions is used in determining the appropriate optimal warning distance.

For example, a speed profile from historical probe data may have been developed along a road segment linking one highway to another highway via a curved ramp. Vehicles travel on highways at roughly constant speed but slow down on the connecting ramp. In this particular example, vehicles travel at constant speed of 60 km/hr and then slow down to 40 km/hr over 200 meters, before speeding back up to 55 km/hr in another 200 meters.

In another example, a speed profile from historical probe data may be developed along a road segment with a peaked bridge that frequently ices over in winter when the temperature is below 0° C. and the humidity is high (e.g., greater than 75% relative humidity). Historical data shows that drivers are able to navigate the hazard by slowing to 20 km/hr before the crest of the bridge. The data also shows that drivers that do not slow down to 20 km/hr are unable to maintain control of the vehicle on the decent. Therefore, providing an alert at an optimal warning distance before the crest of the bridge may assist those drivers who may be unaware of the roadway condition (such as a driver who has never driven on the roadway segment before, or a younger, inexperienced driver who may not think it is necessary to slow down to 20 km/hr).

In yet another example, a blind mountain curve with an immediate stop at the end requires a quick reaction time to stop when other vehicles are also stopped at the end. A clear flashing light marks the dangerous curve but distances are hard to judge for certain drivers. Accidents occur with drivers having slow reaction times or drivers with inexperience with driving at night or when visibility is poor. In this example, the mountain frequently fogs in under certain weather conditions. Additionally, rain can make the road slippery. Historical data, driver characteristics, weather, time of day, and vehicle characteristics may play a part in determining the correct warning distance for these road and weather conditions.

In certain embodiments, the vehicle's speed ($V_0$) may not be known. In such cases, the vehicle may have an approximated initial speed equal to the average or median speed of historical probe data at the particular roadway location of the vehicle. In such embodiments, the vehicle's braking distance may be correlated with the approximated speed of the vehicle.

In certain embodiments, the vehicle's braking distance is a determined based on a combination of both historical probe data and physics principles. For example, historical probe data may be used to determine the initial ($V_0$) and final target ($V_1$) speeds of the vehicle along a road segment, and physics principles could be used to calculate the vehicle braking distance from those speeds using equation (2).

Determining Operator's Reaction Profile

In order to provide a personalized alert to an individual vehicle operator or vehicle navigation system of a roadway condition at an optimal time, a reaction profile of the vehicle operator is determined for a personalized braking distance ($D_{PR}$). The reaction profile may comprise characteristics such as an operator's driving preferences for adjusting speed and/or the operator's reaction time (i.e., the time needed to perceive an alert to brake and to react by braking). Specifically, a vehicle operator's preference or comfort level for how quickly the vehicle's speed is adjusted may be a factor to consider for when the vehicle receives an alert to adjust speed. For example, in the case of an autonomous driving vehicle, the vehicle operator may not be manually controlling the rate of acceleration or deceleration of the vehicle. Therefore, the operator's preference for when the vehicle receives an alert to adjust its speed may depend on the operator's driving preferences (e.g., aggressive or conservative speed adjustments).

In certain embodiments, a reaction profile or reaction profile characteristics may be provided to a vehicle processor/server from a connected network, wherein reaction profile characteristics are programmed prior to operating the vehicle. In other embodiments, the vehicle operator may "upload" the operator's reaction profile (or at least certain reaction profile characteristics) upon entering the vehicle. The entering of the reaction profile characteristics may be associated with a programmed reaction profile stored by an apparatus carried by the operator (e.g., RFID device, a key fob, or mobile phone). In certain embodiments, a vehicle operator could transport personalized reaction profile information regardless of the vehicle being operated. In other words, the operator could enter a new vehicle and upload reaction profile data of the operator from other driving experiences or preferences.

In certain embodiments, the reaction profile for determining the personalized braking distance ($D_{PR}$) may include one or more of the following factors: (1) an operator's age, (2) an operator's health, (3) an operator's driving experience and accident history, (4) an operator's experience or knowledge traveling on the roadway at issue, (5) an operator's experience or knowledge operating the vehicle at issue, (6) an operator's employer's driving profile preferences, (7) an operator's insurance provider's driving profile preferences, (8) an operator's personal driving preferences, and/or (9) an operator's reaction time ($T_{PR}$). In certain embodiments, the reaction profile comprises a combination of more than one factor or variable. In some embodiments, the combination of factors may be weighted, wherein one factor is given more weight than other factors in determining the appropriate, personalized braking distance.

For instance, operator's braking distance ($Dp_R$) may be defined as:

$$D_{PR}=a*V_0T_{PR}+b*X+c*Y \quad (3)$$

wherein:
$V_0$ is the vehicle's initial velocity;
$T_{PR}$ is the operator's reaction time;
X and Y refer to additional personalized characteristic factors affecting braking distance (additional characteristics are available, but not referenced in the equation for simplicity); and
a, b, and c refer to weights attributed to each factor, wherein 0≤a, b, c≤1, and a+b+c=1.

In some embodiments, X and/or Y may be negative values, wherein the operator's braking distance may be reduced based on the personalized characteristics of the operator.

Referring to the personalized characteristic factors above, the age of the vehicle operator may influence the reaction profile, wherein a younger driver may prefer to adjust speed of the vehicle more quickly than an older driver.

Health characteristics may include whether or not the operator has any heart conditions, hearing impairments, etc. that may affect how the vehicle speed is adjusted and how the operator is alerted to the roadway condition to adjust vehicle speed.

Driving experience or accident history of the operator may dictate the timing of the alert, wherein a driver with more accidents may need an earlier warning (and larger braking distance) to adjust speed of the vehicle.

The operator's knowledge of roadway may also influence optimal warning distance, wherein an operator with no knowledge or experience driving on a particular roadway may correspond with an increase in the operator's braking distance.

Similarly, an operator's knowledge of vehicle being driven may correlate with the optimal warning distance, wherein an operator's lack of knowledge (e.g., a rental car) may require an increase in the optimal braking distance.

In some embodiments, an employer (e.g., a trucking company or delivery company) or insurance company may require its employees or vehicle operators to drive under specific safety standards, wherein the optimal braking distance and timing of the alert is influenced by the employer's or insurance company's driving guidelines.

An operator's reaction time ($T_{PR}$) may also be correlated into a reaction distance based on the vehicle's velocity at the time. In some embodiments, with reference to equation (3) above, a=1, b=0, and c=0. In other words, the operator's braking distance is a function of the operator's reaction time:

$$D_{PR}=V_0T_{PR} \quad (4)$$

In certain embodiments, the operator's reaction time ($T_{PR}$) may be based on: (1) a predetermined fixed value, (2) a manually entered value by the operator, (3) a computed reaction time, (4) a variable or historical reaction time, or (5) a combination thereof. In some embodiments, the operator's reaction time may be a combination of various factors. For example, the reaction time may be based on the computed reaction time of the operator and historical reaction time data of the operator over time. Such a combination of factors may be a weighted average, wherein more weight is given to one factor over other factors.

Predetermined Fixed Reaction Time

In one embodiment, the vehicle operator reaction time is a predetermined fixed reaction time requiring no input from the vehicle operator. The fixed reaction time may serve as a default reaction time. For example, a vehicle operator may have a default fixed reaction time of 2.5 seconds, wherein the default value presumes that it will take the operator about 2.5 seconds after receiving an alert to comprehend and take action to adjust the speed of the vehicle.

In some embodiments, the fixed reaction time is determined based on an average reaction time compiled among a plurality of vehicle operators. A database may compile a plurality of vehicle operator reaction times based on any number of factors (such as those described in greater detail below) to determine a default reaction time. For example, the default reaction time may be the average reaction time of a number of reaction times manually entered by vehicle operators.

Manually Entered or Uploaded Reaction Time

In another embodiment, the vehicle operator may manually enter a reaction time. For example, upon entering the vehicle, prior to driving, an operator may enter into a vehicle computer system a preferred reaction time (e.g., 2.5 seconds) for the time the operator believes it will take to hear or see an alert to adjust speed before beginning to adjust speed. The vehicle operator may manually enter a reaction time each time the operator enters and starts the vehicle. In other embodiments, after entering a reaction time once, the time serves as a default reaction time until manually adjusted by the operator.

In certain embodiments, as mentioned above, the vehicle operator may "upload" a preferred reaction time upon entering the vehicle. This entering of a reaction time may be associated with a reaction time stored by an apparatus carried by the operator (e.g., RFID device, a key fob, or mobile phone). In certain embodiments, a vehicle operator could transport personalized reaction time information regardless of the vehicle being operated. In other words, the operator could enter a new vehicle and upload reaction time data of the operator from other driving experiences or preferences. This may be a bootstrap for learning the reaction time by the vehicle operating system.

Operator or Vehicle Computed Reaction Time

In certain embodiments, a reaction time is computed through completion of a series of visual and/or audio tests by the operator. Upon entering the vehicle, prior to driving, an operator may be presented with a series of tests on the vehicle computer system. The tests may include clicking a button or tapping on a display screen in response to seeing a change in color on the display screen or hearing an audio signal. The operator's average reaction time in response to the series of tests may be correlated with a reaction time while operating the vehicle. For example, an operator may have an average test response time to the series of visual tests of 0.3 seconds. Such a response time may correlate to a reaction time while driving of, for example, 1.5 seconds.

The vehicle operator may conduct the series of tests for a computed reaction time each time the operator enters and starts the vehicle. The tests may also be conducted at time intervals throughout the trip, wherein, if the vehicle is in motion, the tests may be limited to audio signals only. In other embodiments, after computing a reaction time once, the computed time may serve as a default reaction time until tested again by the operator.

In some embodiments, the vehicle operator reaction time may be computed by a vehicle server/navigation system and/or an external server after a period of use of the vehicle. The vehicle navigation system may be in communication with a map database (whether stored within the vehicle system or outside the vehicle system and connected through a network). Correlations may be made between the operation of the vehicle and roadway conditions registered in the map database. Specifically, the vehicle or external system may calculate an operator's reaction times based on when the operator made an adjustment in speed for a specific roadway condition. Such reaction times may take into account an operator's driving preferences (i.e., whether to slow down quickly or slow down gradually).

Variable and Historical Reactions Time

In certain embodiments, an operator reaction time may be variable. An operator's reaction time may be different at different times of the day (e.g., 12:30 p.m. versus 3:30 a.m.), different days of the week (e.g., workday versus weekend), or different days of the year (e.g., workday versus holiday). Therefore, an operator's reaction time may be adjusted based upon the time of day. In some embodiments, a fixed or default reaction time is provided for various time windows of the day, week, or year. In other embodiments, adjustments may be made to a manually entered or computed reaction time based upon differences in the time the reaction time was manually entered or computed and the present time the operator is traveling in the vehicle. For example, a computed reaction time at 12:30 p.m. of 2 seconds may be adjusted to 3 seconds when the operator is traveling in the vehicle at 3 a.m. The adjustment may be computed by a server stored within the vehicle or an external server in communication with the vehicle.

In some embodiments, the operator reaction time may be based on historical data. For example, the reaction time may be set based on previously determined reaction times at similar times of day, days of the week, or days of the year. Reaction time may also be varied based on the operator's vehicle location and historical reaction times recorded and stored near the vehicle location.

Determined reaction times, such as manually entered or computed (operator or vehicle), may be stored in a vehicle or external database for future reference. In some embodiments, upon entering the vehicle, an operator's reaction time may be determined based on the operator's previously entered or computed reaction time saved in the reaction time database. The reaction time may then vary throughout the operation of the vehicle based on a change in the time of day and a correlated reaction time in the database, or a change in the location of the vehicle and a correlated reaction time in the database.

Weighted Factors

As mentioned above, determination of the reaction time may be weighted based on a plurality of factors. For example, a vehicle or external database may store historical reaction time data based on manual or computed information. This information may be combined with an operator's current manual entry or computation of a new reaction time upon entering the vehicle. In some embodiments, more weight will be given to a current computed reaction time over historical data. In other embodiments, more weight will be given to historical data over a manual, subjectively entered reaction time by a vehicle operator. In some embodiments, the weighting of data may be adjusted as the vehicle is operated and additional driving data is collected. In some embodiments, more weight may be given for the newly collected driving data.

Reporting the Optimal Warning Distance

As discussed above, the optimal warning distance ($D_{TOT}$) may be determined and reported based on a combination of the vehicle's braking distance ($D_{BR}$) and a braking distance associated with the operator's reaction profile ($D_{PR}$). When the vehicle's geographic location coincides with the optimal warning distance from the roadway condition, the operator or an operating system (e.g., navigation system) of the vehicle may be alerted of the roadway condition.

The alert may be transmitted from an external processor/server to the vehicle's navigation system, or may be generated by the vehicle's internal processor/server associated with the navigation system. In some embodiments, the alert is relayed to the vehicle operator as an audio message through the vehicle's speaker system or a navigation device's speaker located within the vehicle. In other embodiments, the alert is relayed to the vehicle operator as a visual message displayed on a vehicle navigation system screen or on a navigation device screen. In yet other embodiments, the alert is relayed to the vehicle operator as both an audio and a visual message.

The alert may provide the type of roadway condition ahead, as well as the course of action to take to avoid a traffic incident. For example, the alert may provide instructions that there is ice on the roadway ahead (e.g., "Caution, ice ahead"), and suggest the operator/vehicle reduce speed to avoid a potential accident (e.g., "Adjust speed to 20 km/hr").

The warning distance may be calculated and/or reported by a processor/server within or connected to the vehicle, or the warning distance may be calculated and/or reported by a processor/server remote from the vehicle, wherein the alert is transmitted over a connected network to the vehicle. In some embodiments, the alert may be transmitted at a determined distance before the vehicle reaches the optimal warning distance based on a known or perceived delay in the transmission of the signal to the vehicle such that the vehicle will receive the alert transmission at the optimal warning distance.

EXAMPLES

Figure 1:
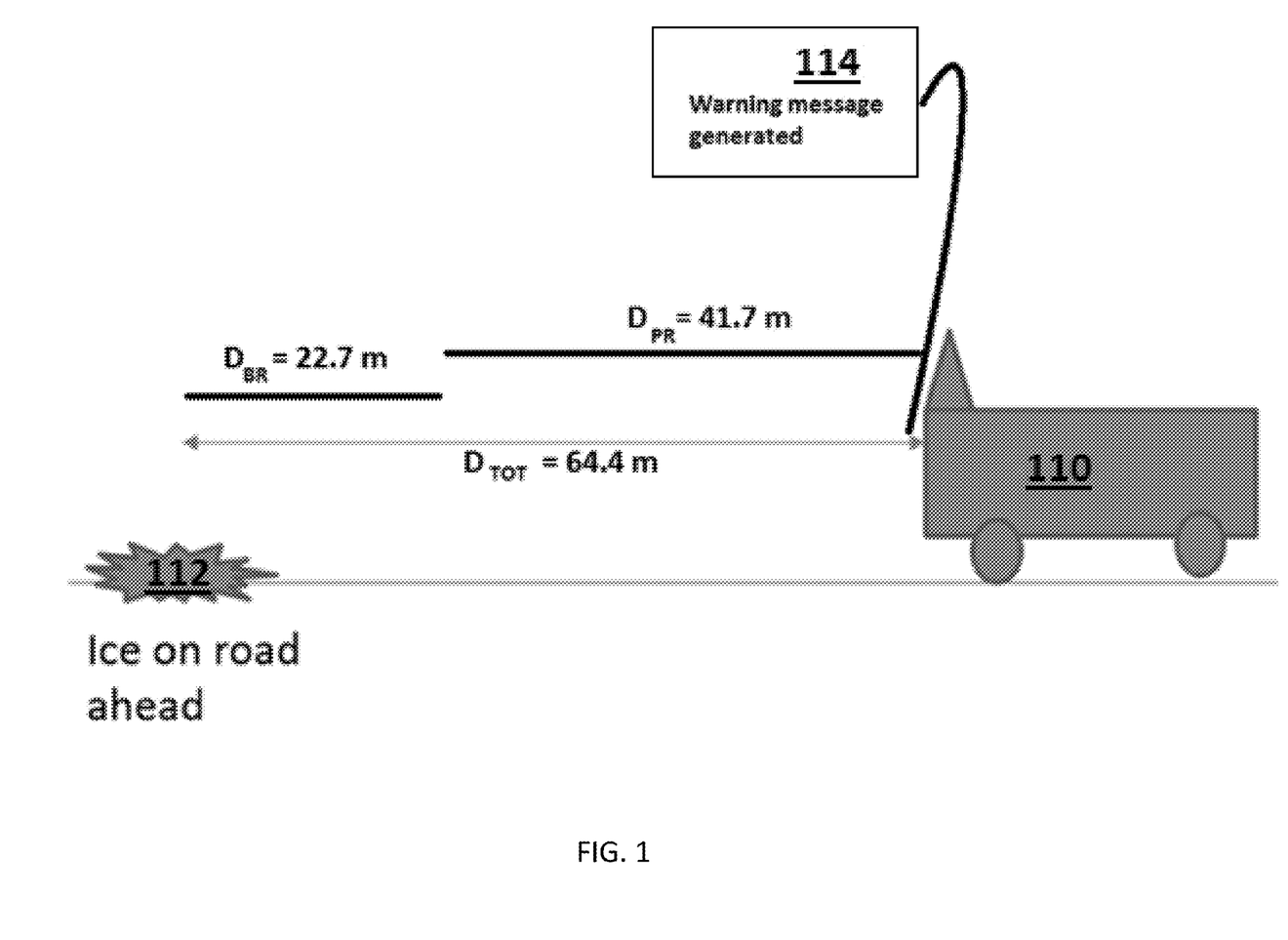
FIG. 1 illustrates an example scenario for calculating an optimal warning distance.

A non-limiting example for determining an optimal warning distance ($D_{TOT}$) is depicted in FIG. 1. In FIG. 1, the roadway condition is an icy patch of roadway 112 ahead of the vehicle 110. The vehicle is traveling at an initial speed ($V_0$) of 60 km/hr. The operator has a reaction time ($T_{PR}$) of 2.5 seconds. A processor has determined that the icy road segment 112 can be safely traversed at a speed ($V_1$) of 40 km/hr. In this particular example, the optimal warning distance ($D_{TOT}$) is calculated using a combination of physics principles for the vehicle's braking distance and the reaction time of the operator:

$$D_{TOT} = \frac{V_0^2 - V_1^2}{2a} + V_0 T_{PR} \quad (5)$$

The vehicle may decelerate safely at a rate of 3.4 m/s². From these variables, the braking distance of the vehicle ($D_{BR}$) is 22.7 m and the operator's reaction distance ($D_{PR}$) is 41.7 m. The total distance ($D_{TOT}$), i.e., the optimal warning distance, is 64.4 m. At the optimal warning distance, the vehicle operator receives an alert 114.

A second non-limiting example determines an optimal warning distance ($D_{TOT}$) based on a fixed or constant braking distance ($D_{BR}=D_{CONST}$), and a personal attribute of the vehicle operator. In this example, the vehicle is an autonomous vehicle and requires no operator reaction time to adjust the speed of the vehicle. Combining equations (1) and (3), the optimal warning distance is calculated as:

$$D_{TOT}=D_{BR}+a*V_0 T_{PR}+b*X+c*Y, \quad (6)$$

wherein $D_{BR}=D_{CONST}$, a=0, b=1, and c=0, resulting in:

$$D_{TOT}=D_{CONST}+X. \quad (7)$$

In this example, the personal attribute X is associated with the operator's age and health. That is, the vehicle operator is 75 years old and has a heart condition. Based on these attributes, the processor/server may determine that the operator would prefer additional time to adjust the speed of the vehicle (i.e., a longer overall braking time). Therefore, X is a positive braking distance value that increases the overall braking distance. As such, the server alerts the vehicle farther upstream of the roadway condition to adjust the speed of the vehicle at a comfortable level for the operator.

Flowchart Embodiment

Figure 2:
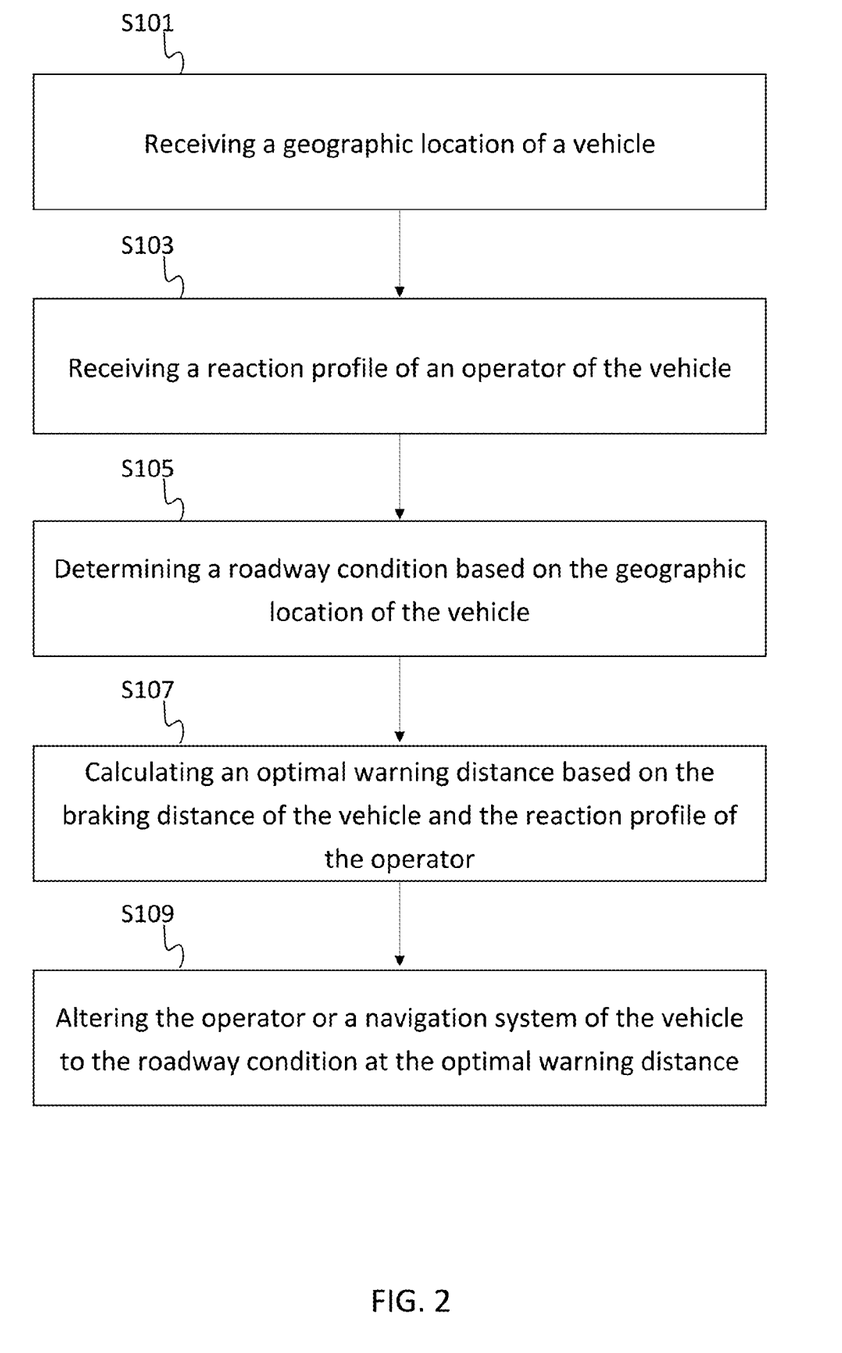
FIG. 2 illustrates an example flowchart for determining an optimal warning distance for a vehicle operator or vehicle navigation system.

FIG. 2 illustrates an example flowchart for determining an optimal warning distance. The process of the flowchart may be performed by a vehicle navigation device and its processor and/or a server and its processor. Alternatively, another device may be configured to perform one or more of the following acts. Additional, fewer, or different acts may be included.

At act S101, a processor and/or server receives a geographic location of a vehicle. In some embodiments, the processor/server also receives a direction of travel of the vehicle. As noted, the processor/server may be included within or attached to the vehicle. In other embodiments, the processor and/or server may be located remotely from the vehicle and in communication with the vehicle through a network.

At act S103, a reaction profile of the operator of the vehicle is received. The reaction profile may include the operator's age, the operator's health, the operator's preferred driving style, the reaction time of the operator, or a combination thereof. In some embodiments, the reaction profile of the operator is a weighted combination of the reaction time of the operator and at least one of the operator's age, the operator's health, or the operator's preferred driving style.

At act S105, based on the geographic location (and direction of travel of the vehicle), a roadway condition is determined. The determination may be made based on a correlation of the location and direction of travel and a map database of traffic information, which may be provided by a traffic service provider.

At act S107, the optimal warning distance is calculated based on the braking distance of the vehicle and the personal attributes of the operator. The braking distance of the vehicle may be a predetermined fixed distance, a calculated distance based on physics principles, a distance based on historical probe data, or a weighted combination thereof.

At act S109, the operator (and/or a device associated with the operator) and/or navigation system of the vehicle are alerted to the roadway condition at or in proximity of the optimal warning distance. In some embodiments, the alert is an audio message or a video message relayed through the vehicle's speakers or navigation system display screen or a navigation device's speaker or display screen. The alert may provide the vehicle operator with the type of roadway condition ahead, as well as the course of action to take to avoid a traffic incident (e.g., "Caution, ice ahead. Reduce speed to 20 km/hr," or "Caution, road curve ahead. Adjust speed to 40 km/hr," or "Caution, traffic congestion ahead. Reduce speed to 0 km/hr.") In some embodiments, in an autonomous vehicle, the operator may not need to be alerted. In such cases, only the navigation system is alerted to the roadway condition.

Navigation Devices and Systems

Figure 3:
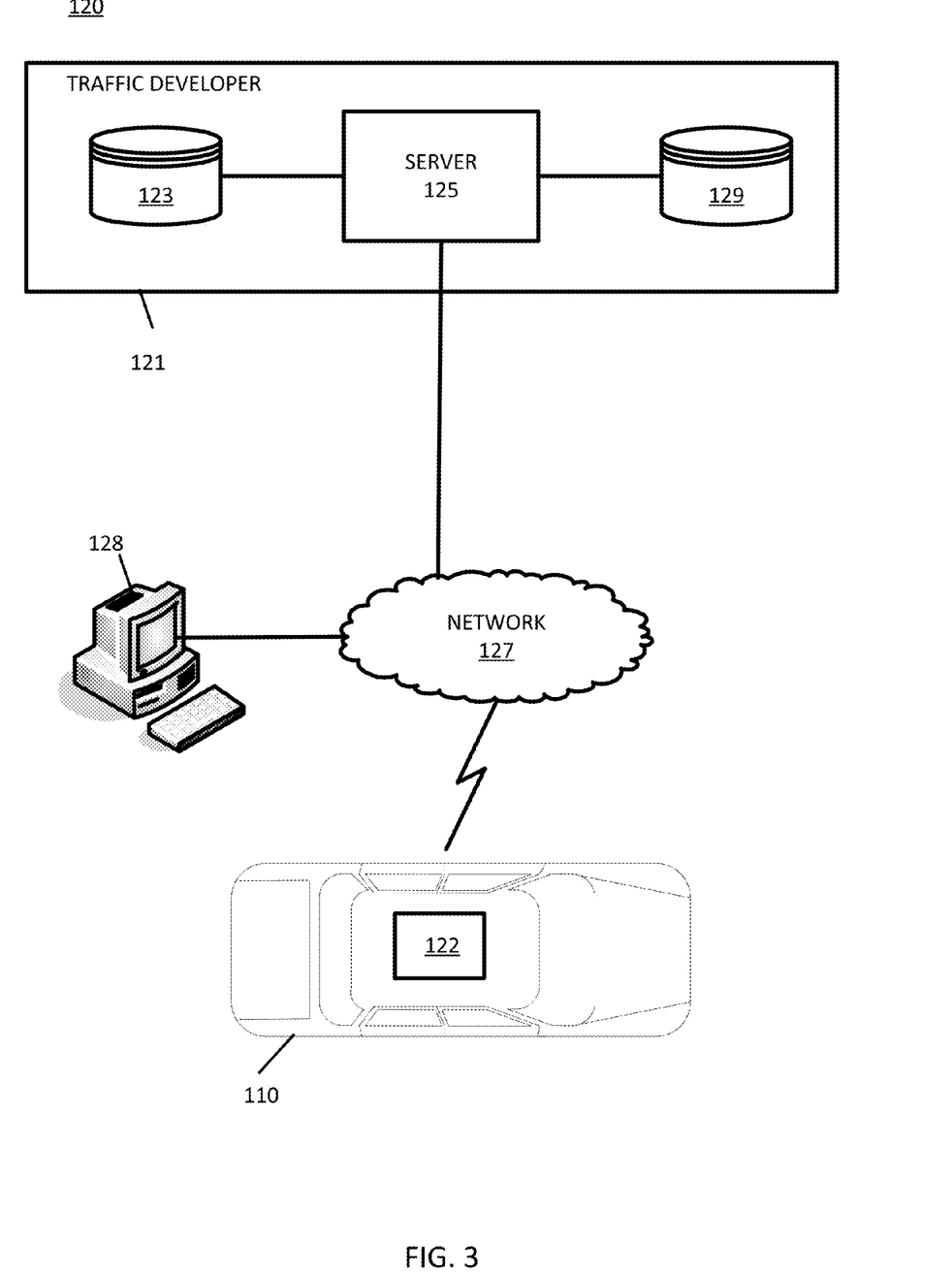
FIG. 3 illustrates an example system for determining an optimal warning distance for a vehicle operator or vehicle navigation system.

As discussed above, determining an optimal warning distance for a vehicle operator may be performed by a vehicle navigation device and its processor and/or a server and its processor. FIG. 3 illustrates one embodiment of a traffic navigation system 120. The system 120 may include a vehicle 110, a map developer system 121, a vehicle navigation device 122, a workstation 128, and a network 127. Additional, different, or fewer components may be provided.

The navigation device 122 may be a personal navigation device ("PND"), a portable navigation device smart phone, a mobile phone, a personal digital assistant ("PDA"), watch, camera, a tablet computer, a notebook computer, and/or any other known or later developed mobile device or personal computer that may perform navigation-related functions (such as digital routing or map display). Non-limiting embodiments of navigation devices may also include RDS devices, HD radio devices, mobile phone devices, or car navigation devices such as Garmin or TomTom.

The map developer system 121 includes a server 125, a map database 123, and a reaction profile database 129. The developer system 121 may include computer systems and networks of a system operator such as HERE, NAVTEQ, or Nokia Corporation. The map database 123 may be configured to store traffic data at specified geographic locations of interest, wherein the data has been collected from historical probe data or real-time traffic data, or the data has been developed from predictive traffic data. The map database 123 may include may include historical probe data collected from a plurality of vehicles traveling on a particular roadway segment at a particular time of day, day of week, or day of year, and under certain weather and roadway conditions. In other words, the database 123 may include historical probe data for a number of vehicles, each vehicle providing information regarding its speed, heading, location, timestamp, etc. Data from within the map database 123 may be used to determine a vehicle braking distance from data such as a determined or predicted vehicle queue length from a roadway condition and/or an average braking distance based on the historical probe data.

In certain embodiments, the map database 123 may include node data records, road segment or link data records, points of interest (P01) data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, the map database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The map database 123 can include data about the POIs and their respective locations in the POI data records. The map database 123 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the map database 123 can include event data (e.g., traffic incidents, constructions, scheduled events, unscheduled events, etc.) associated with the POI data records or other records of the map database 123.

The map database 123 can be maintained by the content provider (e.g., a map developer or traffic service provider) in association with the services platform. By way of example, the map developer can collect geographic data to generate and enhance the map database 123. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The map database 123 can be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form map database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as an end user device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database can be a master map database, but in alternate embodiments, the client side map database can represent a compiled navigation database that can be used in or with end user devices to provide navigation and/or map-related functions. For example, the map database can be used with the end user device to provide an end user with navigation features. In such a case, the map database can be downloaded or stored on the end user device, such as in applications, or the end user device can access the map database through a wireless or wired connection (such as via a server and/or the communication network), for example.

In certain embodiments, the reaction profile database 129 may be separate or combined with the map database 123. The reaction profile database 129 may be configured to store reaction times for various vehicle operators. For each stored reaction time, affiliated information may be linked, such as operator identification, time stamp, a geographic location.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the map database 123. The workstation 128 may also be used to enter data to the reaction profile database 129 indicative of the vehicle operator's reaction time or other personalized attributes (e.g., an operator's age, an operator's health, an operator's driving experience and accident history, an operator's knowledge of the geographic location, an operator's experience operating the vehicle, an operator's employer's driving profile preferences, an operator's insurance provider's driving profile preferences, an operator's personal driving preferences, or a combination thereof). The workstation 128 may include at least a memory, a processor, and a communication interface.

Figure 4:
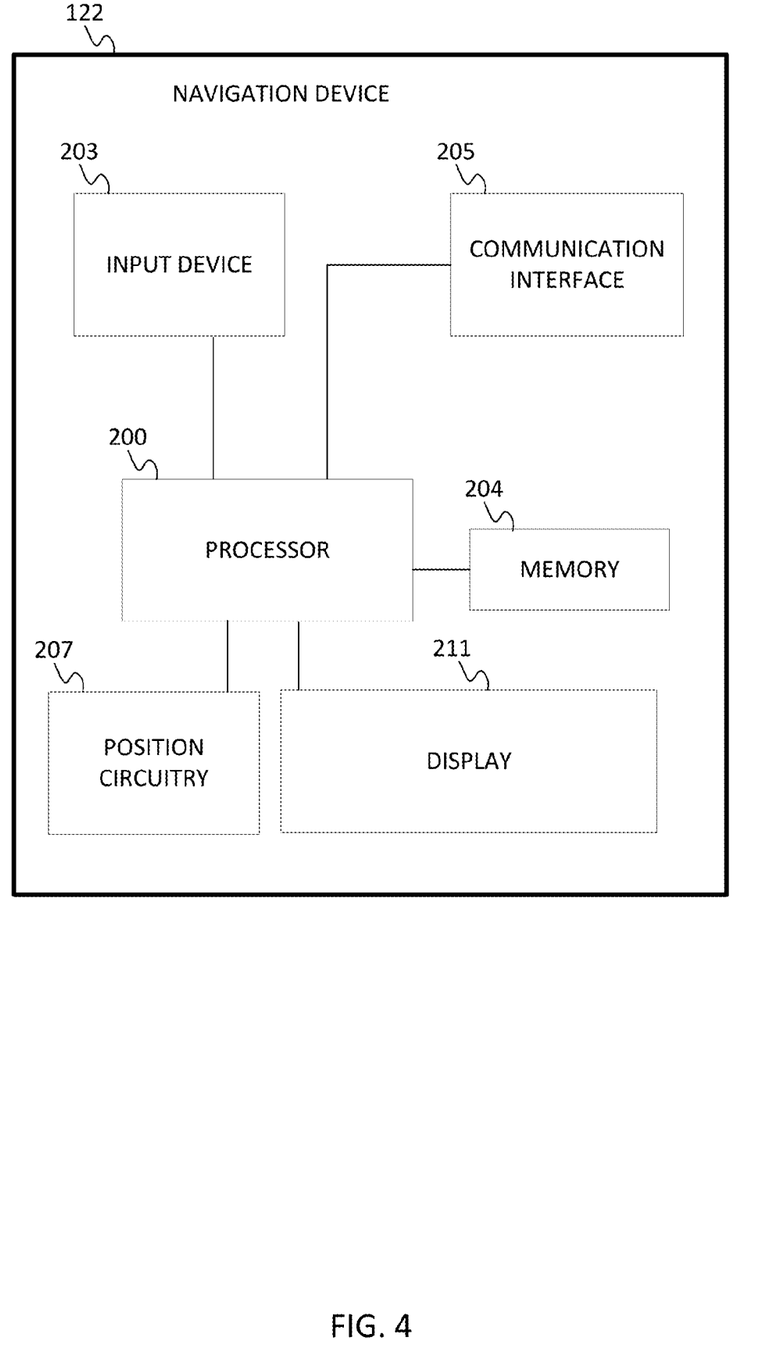
FIG. 4 illustrates an exemplary navigation device of the system of FIG. 3.

FIG. 4 illustrates an exemplary navigation device 122 of the system of FIG. 3. The navigation device 122 includes a processor 200, a memory 204, an input device 203, a communication interface 205, position circuitry 207, and a display 211. Additional, different, or fewer components are possible for the navigation device 122.

The processor 200 may be configured to receive data indicative of the location of the navigation device 122 from the position circuitry 207. The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 5:
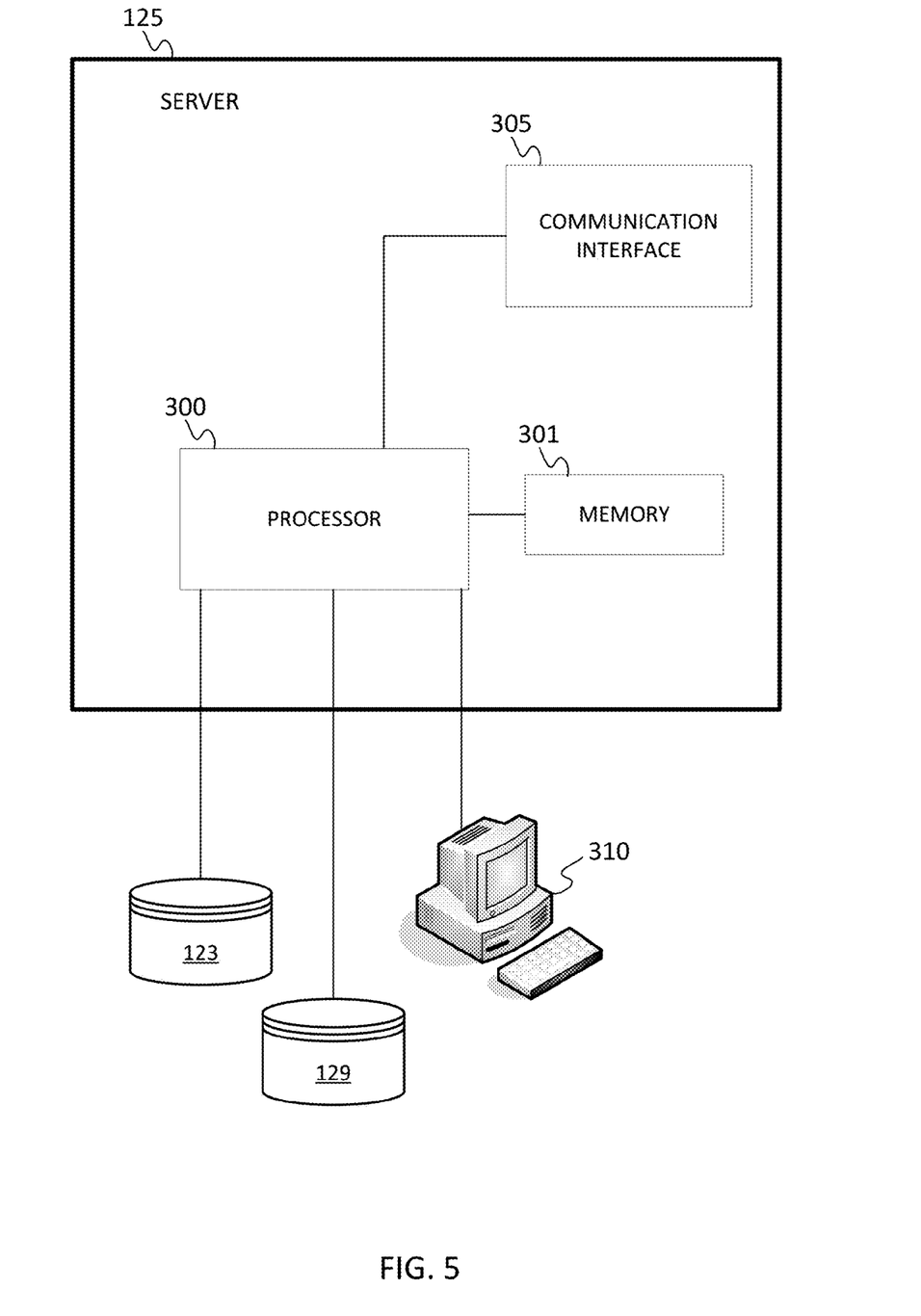
FIG. 5 illustrates an exemplary server of the system of FIG. 3.

FIG. 5 illustrates an exemplary server 125 of the system of FIG. 3. The server 125 includes a processor 300, a communication interface 305, and a memory 301. The server 125 may be coupled to a map database 123, a reaction profile database 129 and/or a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of the methods described above. For example, the navigation device processor 200 and/or server processor 300 may be configured to perform the process of: (1) receive a geographic location and direction of travel of a vehicle; (2) receive a reaction profile of an operator of the vehicle; (3) determine a roadway condition in the direction of travel of the vehicle based on the geographic location of the vehicle; (4) calculate an optimal warning distance from the roadway condition based on a braking distance of the vehicle and the reaction profile of the operator; and (5) alert the operator or a navigation system of the vehicle to the roadway condition when the vehicle is located at the optimal warning distance.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In certain embodiments, determination and retrieval of a traffic map image on the navigation device may be used to provide functions for an autonomous vehicle or highly assisted driving (HAD) vehicle. The navigation device 122 or another computer system in communication with the navigation device 122 may include instructions for routing or operating the autonomous or highly assisted driving vehicle. An estimated travel time may be calculated based on the traffic map data and a route may be chosen based on the estimate travel time. The computing system may generate driving commands for steering the vehicle, shifting gears, increasing and decreasing the throttle, and braking. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method comprising:
   receiving a geographic location of a vehicle;
   receiving a reaction profile of an operator of the vehicle;
   determining, using a processor, a roadway condition based on the geographic location of the vehicle;
   calculating an optimal warning distance from the roadway condition based on a braking distance of the vehicle and the reaction profile of the operator; and
   alerting the operator or a navigation system of the vehicle to the roadway condition when the vehicle is located at the optimal warning distance;
   wherein the reaction profile includes a vehicle computed reaction time of the operator of the vehicle, the vehicle computed reaction time selected from a database comprising a plurality of times from historical probe data that an operator adjusted a velocity ahead of a roadway condition, wherein the roadway condition is a scenario for which the vehicle reduces speed for safety.

2. A method comprising:
   receiving a geographic location of a vehicle;
   receiving a reaction profile of an operator of the vehicle from a profile database including reaction profiles for multiple operators;
   determining, using a processor, a roadway condition based on the geographic location of the vehicle;
   calculating an optimal warning distance from the roadway condition based on a braking distance of the vehicle and the reaction profile of the operator; and
   alerting the operator or a navigation system of the vehicle to the roadway condition when the vehicle is located at the optimal warning distance,
   wherein the reaction profile comprises a reaction time of the vehicle operator,
   wherein the reaction time is a vehicle computed reaction time, the vehicle computed reaction time selected from a database comprising a plurality of times an operator adjusted velocity of a vehicle, each time associated with a distance from a known roadway condition.

3. The method of claim 2, wherein the reaction time is an operator computed reaction time, wherein the operator is subjected to a series of visual tests or audio tests.

4. A method comprising:
   receiving a geographic location of a vehicle;
   receiving a reaction profile of an operator of the vehicle from a profile database including reaction profiles for multiple operators;
   determining, using a processor, a roadway condition based on the geographic location of the vehicle;
   calculating an optimal warning distance from the roadway condition based on a braking distance of the vehicle and the reaction profile of the operator; and
   alerting the operator or a navigation system of the vehicle to the roadway condition when the vehicle is located at the optimal warning distance,
   wherein the reaction profile comprises a reaction time of the vehicle operator,
   wherein the reaction time is a vehicle computed reaction time, the vehicle computed reaction time selected from a database comprising a plurality of times an operator adjusted velocity of the vehicle, each time associated with a known roadway condition and a distance from the known roadway condition.

5. The method of claim 2, wherein the reaction time is a variable reaction time based on a time of day, day of week, or day of year of operation of the vehicle.

6. The method of claim 1, wherein the reaction profile of the operator comprises an operator's age, an operator's health, an operator's driving experience and accident history, an operator's knowledge of the geographic location, an operator's experience operating the vehicle, an operator's employer's driving profile preferences, an operator's insurance provider's driving profile preferences, an operator's personal driving preferences, an operator's reaction time, or a combination thereof.

7. The method of claim 6, wherein the reaction profile of the operator is a weighted combination of the reaction time of the operator and at least one of: the operator's age, the operator's health, the operator's driving experience and accident history, the operator's knowledge of the geographic location, the operator's experience operating the vehicle, the operator's employer's driving profile preferences, the operator's insurance provider's driving profile preferences, or the operator's personal driving preferences.

8. The method of claim 1, wherein the braking distance of the vehicle is determined from a predetermined fixed distance, a calculated distance based on physics principles, an average braking distance based on historical probe data, a vehicle queue length from the roadway condition, or a weighted combination thereof.

9. A non-transient computer readable medium containing program instructions for causing a computer to perform the method of:
   receiving a geographic location and direction of travel of an autonomous vehicle;
   receiving a reaction profile including historically recorded driver characteristics including braking distances for a roadway condition, and including an operator's age, an operator's health, an operator's driving experience and accident history, an operator's knowledge of the geographic location, an operator's experience operating the vehicle, an operator's employer's driving profile preferences, an operator's insurance provider's driving profile preferences, an operator's personal driving preferences, or a combination thereof;
   determining a roadway condition in the direction of travel of the vehicle based on the geographic location of the vehicle;
   calculating an optimal warning distance from the roadway condition based on a braking distance of the vehicle and the reaction profile of the operator; and
   alerting a navigation system of the autonomous vehicle to the roadway condition when the vehicle is located at the optimal warning distance.

10. An apparatus comprising:
    at least one processor; and
    at least one memory including computer program code for one or more programs; the at least one memory and the computer program code configured to, with the at least one processor, cause the apparatus to at least perform:
    receive a geographic location and direction of travel of a vehicle;
    receive a reaction profile of an operator of the vehicle from a plurality of reaction profiles for a plurality of operators in a database, wherein the reaction profile includes historically recorded driver characteristics including braking distances for a roadway condition;
    determine the roadway condition exists in the direction of travel of the vehicle based on the geographic location of the vehicle;
    calculate an optimal warning distance from the roadway condition based on a braking distance of the vehicle and the reaction profile of the operator including historically recorded driver characteristics for the roadway condition; and alert the operator or a navigation system of the vehicle to the roadway condition when the vehicle is located at the optimal warning distance.

11. The apparatus of claim 10, wherein the reaction profile is a manually entered reaction time by the vehicle operator.

12. The apparatus of claim 10, wherein the reaction profile is an operator computed reaction time, wherein the operator is subjected to a series of visual tests or audio tests.

13. An apparatus comprising:
at least one processor; and
at least one memory including computer program code for one or more programs; the at least one memory and the computer program code configured to, with the at least one processor, cause the apparatus to at least perform:
receive a geographic location and direction of travel of a vehicle;
receive a reaction profile of an operator of the vehicle;
determine a roadway condition in the direction of travel of the vehicle based on the geographic location of the vehicle;
calculate an optimal warning distance from the roadway condition based on a braking distance of the vehicle and the reaction profile of the operator; and
alert the operator or a navigation system of the vehicle to the roadway condition when the vehicle is located at the optimal warning distance,
wherein the reaction profile is a vehicle computed reaction time, the vehicle computed reaction time selected from a database comprising a plurality of times an operator adjusted velocity of the vehicle, each time associated with a known roadway condition and a distance from the known roadway condition.

14. The apparatus of claim 10, wherein the reaction profile is (1) a variable reaction time based on a time of day, day of week, or day of year of operation of the vehicle, or (2) determined from a historical database of operator reaction times.

15. The apparatus of claim 10, wherein the reaction profile is a weighted combination of at least two reaction time factors selected from the group consisting of: a predetermined reaction time, a manually entered reaction time, an operator computed reaction time, a vehicle computed reaction time, and historical reaction time data of the operator.

16. The apparatus of claim 10, wherein the reaction profile is an operator's age, an operator's health, an operator's driving experience and accident history, an operator's knowledge of the geographic location, an operator's experience operating the vehicle, an operator's employer's driving profile preferences, an operator's insurance provider's driving profile preferences, an operator's personal driving preferences, or an operator's reaction time, or a combination thereof.

17. The apparatus of claim 16, wherein the reaction profile of the operator is a weighted combination of the reaction time of the operator and at least one of: the operator's age, the operator's health, the operator's driving experience and accident history, the operator's knowledge of the geographic location, the operator's experience operating the vehicle, the operator's employer's driving profile preferences, the operator's insurance provider's driving profile preferences, or the operator's personal driving preferences.

18. The apparatus of claim 10, wherein the braking distance of the vehicle is determined from a predetermined fixed distance, a calculated distance based on physics principles, an average braking distance based on historical probe data, a vehicle queue length from the roadway condition, or a weighted combination thereof.

* * * * *